United States Patent
Imoto et al.

(10) Patent No.: US 11,152,023 B2
(45) Date of Patent: Oct. 19, 2021

(54) MANUFACTURING METHOD REGULATING A RELATIVE POSITION BETWEEN A FLEXURE AND A LOAD BEAM OF A DISC DEVICE SUSPENSION, AND SUSPENSION ASSEMBLY USED IN SAID MANUFACTURING METHOD

(71) Applicant: NHK SPRING CO., LTD., Yokohama (JP)

(72) Inventors: Koichi Imoto, Yokohama (JP); Kunihiro Tsutsumi, Yokohama (JP); Kazuhiro Sugiyama, Yokohama (JP); Masaki Matsuzawa, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 17/163,130

(22) Filed: Jan. 29, 2021

(65) Prior Publication Data

US 2021/0249041 A1     Aug. 12, 2021

(30) Foreign Application Priority Data

Feb. 10, 2020   (JP) .............................. JP2020-020749

(51) Int. Cl.
   *G11B 5/48*   (2006.01)
(52) U.S. Cl.
   CPC ............ *G11B 5/4833* (2013.01); *G11B 5/484* (2013.01)
(58) Field of Classification Search
   CPC ..... G11B 5/4833; G11B 5/484; G11B 5/4826; Y10T 29/49021
   See application file for complete search history.

(56) References Cited

U.S. PATENT DOCUMENTS

| | | | | |
|---|---|---|---|---|
| 6,173,485 | B1 * | 1/2001 | Shiraishi .................. | G11B 5/48 29/603.04 |
| 6,571,455 | B2 * | 6/2003 | Takagi ................. | G11B 5/4826 29/426.4 |
| 7,386,932 | B2 * | 6/2008 | Girard .................. | G11B 5/4826 29/603.03 |
| 8,477,507 | B2 * | 7/2013 | Ihara ...................... | G11B 5/484 361/749 |
| 8,561,286 | B2 | 10/2013 | Ikeji et al. | |
| 9,313,880 | B2 * | 4/2016 | Ihara .................... | H05K 1/0269 |
| 9,451,704 | B2 * | 9/2016 | Ihara .................... | H05K 3/4685 |
| 10,109,307 | B2 * | 10/2018 | Tokiwa ................ | G11B 5/4833 |
| 10,210,890 | B2 * | 2/2019 | Fujimura ............... | H05K 3/241 |

(Continued)

FOREIGN PATENT DOCUMENTS

JP       2010225261 A    10/2010

*Primary Examiner* — Brian E Miller
(74) *Attorney, Agent, or Firm* — Holtz, Holtz & Volek PC

(57) ABSTRACT

A manufacturing method of a disc device suspension includes forming a load beam blank including the load beam and a first frame continuous to the load beam, forming a flexure blank including the flexure and a second frame continuous to the flexure, forming a convex portion in the first frame, forming an opening in the second frame in a position corresponding to the convex portion to receive the convex portion, overlapping the load beam blank with the flexure blank to insert the convex portion into the opening, fixing the flexure to the load beam, and separating the load beam from the first frame and the flexure from the second frame after the fixing.

14 Claims, 7 Drawing Sheets

(56) References Cited

U.S. PATENT DOCUMENTS

| | | | | |
|---|---|---|---|---|
| 2002/0063997 A1* | 5/2002 | Takagi | ............... | G11B 5/4826 |
| | | | | 360/244.6 |
| 2008/0049360 A1* | 2/2008 | Fujiwara | ............... | G11B 5/486 |
| | | | | 360/244.5 |
| 2010/0032201 A1* | 2/2010 | Ooyabu | ............... | H05K 1/0266 |
| | | | | 174/262 |
| 2010/0242263 A1* | 9/2010 | Ikeji | ............... | G11B 5/484 |
| | | | | 29/603.07 |
| 2013/0055557 A1* | 3/2013 | Tokiwa | ............... | G11B 5/4833 |
| | | | | 29/603.01 |
| 2013/0098885 A1* | 4/2013 | Takei | ............... | G11B 5/4833 |
| | | | | 219/121.64 |
| 2015/0264795 A1* | 9/2015 | Ooyabu | ............... | G11B 5/4833 |
| | | | | 174/262 |
| 2016/0111117 A1* | 4/2016 | Yamada | ............... | G11B 5/4833 |
| | | | | 428/800 |
| 2016/0316555 A1* | 10/2016 | Yamada | ............... | G11B 5/484 |

\* cited by examiner

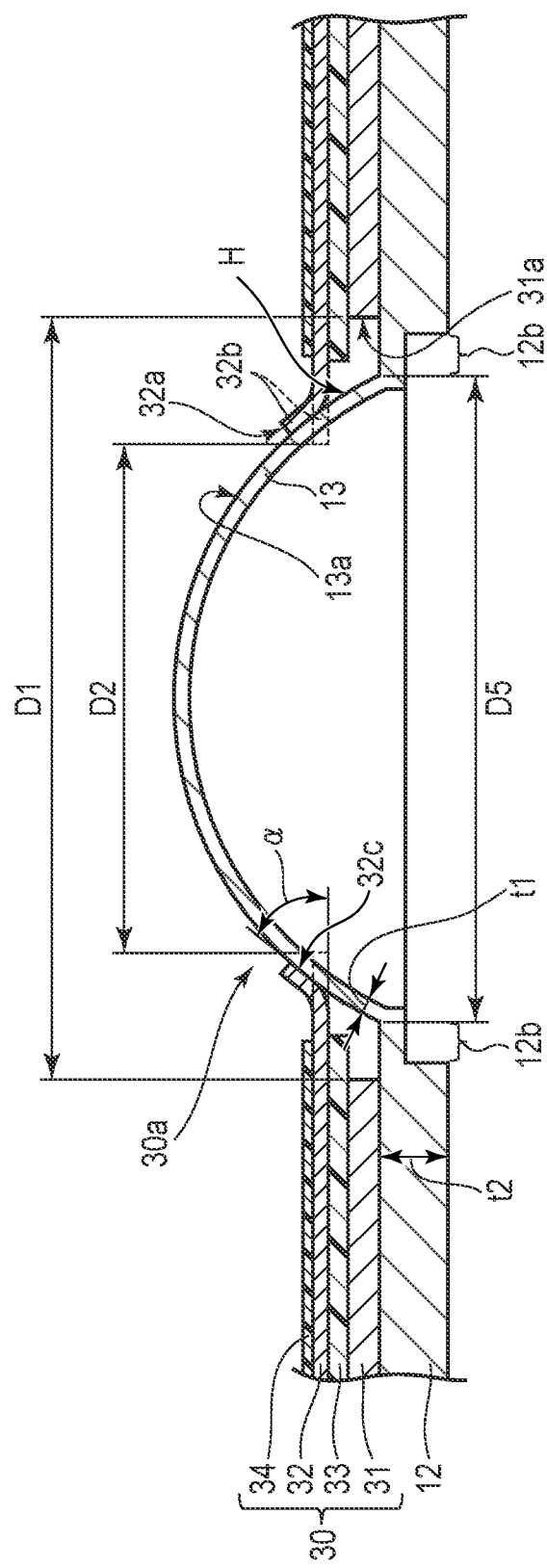
F I G. 5

MANUFACTURING METHOD REGULATING A RELATIVE POSITION BETWEEN A FLEXURE AND A LOAD BEAM OF A DISC DEVICE SUSPENSION, AND SUSPENSION ASSEMBLY USED IN SAID MANUFACTURING METHOD

CROSS-REFERENCE TO RELATED APPLICATIONS

This application is based upon and claims the benefit of priority from prior Japanese Patent Application No. 2020-020749, filed Feb. 10, 2020, the entire contents of which are incorporated herein by reference.

BACKGROUND OF THE INVENTION

1. Field of the Invention

The present invention relates generally to a manufacturing method of a disc device suspension used in a hard disc device or the like, and a suspension assembly used in the manufacturing method.

2. Description of the Related Art

Hard disc devices (HDDs) are used in an information processor such as a personal computer. A hard disc device includes, for example, a magnetic disc which rotates around a spindle, and a carriage which turns about a pivot axis. The carriage includes an actuator arm, and turns about the pivot axis in the track width direction of the disc by a positioning motor such as a voice coil motor.

A disc device suspension (hereinafter referred to as suspension) is attached to the actuator arm. The suspension includes, for example, a load beam and a flexure arranged to overlap the load beam. A gimbal formed in a proximity of the tip of the flexure includes a slider which is a part of a magnetic head. The slider includes an element (transducer) used for accessing (e.g., reading/writing) data. The load beam, flexure, and slider form a head gimbal assembly. The gimbal includes a tongue to mount the slider and a pair of outriggers formed in both sides of the tongue.

In order to achieve high recording density of a disc, a smaller head gimbal assembly is required, and furthermore, positioning of a slider with respect to a recording surface of the disc with higher accuracy is required. When the head gimbal assembly is miniaturized, and size of the slider used therein is miniaturized accordingly. Since the load beam and the flexure are formed separately, the accuracy of positioning of the flexure with respect to the load beam is important.

If the accuracy of positioning of the flexure with respect to the load beam is poor, misposition of line terminals may occur. The misposition of line terminals appears as shifting between line terminals and terminals of the slider when the slider is attached to the dimple center, and it causes a conductivity error such as short circuit. Thus, when the flexure is fixed to the load beam, improvement of the accuracy of positioning of the load beam and the flexure is required.

For example, JP 2010-225261 A discloses a manufacturing method of a suspension. In this manufacturing method, in order to position the load beam and the flexure, a positioning part is formed in a frame which is continuous to the load beam, and an engaging part which can engage the positioning part is formed in a part of the frame which is continuous to the flexure such that the positioning part is engaged to the engaging part. As in JP 2010-225261 A, if the positioning part in the load beam side is formed in a dome-like convex shape and the engaging part in the flexure side is formed as a simple hole, when the convex portion is engaged in the hole, an R shape part of the bottom part of the convex portion may interfere with the edge of the hole. Furthermore, since the flexure is formed of a stainless steel, when the engaging part is engaged to the positioning part, it may not engage well since it does not match the positioning part which is similarly formed of a stainless steel dome-like convex shape. Thus, such a structure is not suitable for the improvement of the accuracy of positioning of the flexure with respect to the load beam.

BRIEF SUMMARY OF THE INVENTION

One of targets to be achieved by the present invention is a manufacturing method of a suspension which can accurately regulate a relative position between a load beam and a flexure, and a suspension assembly used in the manufacturing method.

According to an embodiment, a manufacturing method of a disc device suspension includes: forming a load beam blank including the load beam and a first frame continuous to the load beam; forming a flexure blank including the flexure and a second frame continuous to the flexure; forming a convex portion in the first frame; forming an opening in the second frame in a position corresponding to the convex portion to receive the convex portion; overlapping the load beam blank with the flexure blank to insert the convex portion into the opening; fixing the flexure to the load beam; and separating the load beam from the first frame and the flexure from the second frame after the fixing. The second frame includes a metal base and a conductor layer formed of a metal material which is softer than the load beam, and the opening includes a first opening formed in the metal base and a second opening formed in the conductor layer to overlap the first opening, and the conductor layer includes an edge protruding to the inner side more than the inner surface of the first opening, and the edge contacts the convex portion when the convex portion is inserted into the opening.

The convex portion may be formed in a dome-like shape. The first opening and the second opening may be circular, and the diameter of the first opening may be greater than the outer diameter of the convex portion while the diameter of the second opening may be smaller than the outer diameter of the convex portion. The edge of the second opening may contact the convex portion.

When the convex portion is inserted into the opening, the edge of the second opening may be transformed along the convex portion. The edge of the second opening may be bent before the convex portion is inserted into the opening. An opening may be formed in the convex portion.

A pad connected to a terminal of a slider to perform read/write of data may be formed of the same metal material used for the conductor layer in the same layer as with the conductor layer.

According to an embodiment, a suspension assembly includes a load beam blank and a flexure blank for disc device suspension. The load beam blank includes a load beam, a first frame continuous to the load beam, and a convex formed in the first frame. The flexure blank includes a flexure overlapping the load beam, a second frame continuous to the flexure, and an opening formed in a position corresponding to the convex portion of the second frame. The second frame includes a metal base and a conductor layer formed of a metal material softer than the load beam. The opening includes a first opening formed in the metal base and a second opening formed in the conductor layer to overlap the first opening. The conductor layer includes an edge protruding to the inner side more than the inner surface of the first opening.

The convex portion may be formed in a dome-like shape. The first opening and the second opening may be circular, and the diameter of the first opening may be greater than the outer diameter of the convex portion while the diameter of the second opening may be smaller than the outer diameter of the convex portion. The thickness of the part of the first frame where the convex portion is formed may be thinner than the thickness of the part thereof other than the convex portion.

The convex portion may include an opening. The flexure may include a pad connected to a terminal of a slider to perform read/write of data, and the pad may be formed of the same metal material used for the conductor layer in the same layer as with the conductor layer.

According to the present invention, a manufacturing method of a suspension which can accurately regulate a relative position between a load beam and a flexure, and a suspension assembly used in the manufacturing method will be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a schematic partial cross-sectional view of the suspension assembly, taken along line B-B of FIG. 4.

DETAILED DESCRIPTION OF THE INVENTION

Embodiments will be explained with reference to the accompanying drawings.

First Embodiment

In a manufacturing method of the present embodiment, a disc device suspension is manufactured using a load beam blank including a load beam and a flexure blank including a flexure. In the following description, a structure applicable to the load beam blank, flexure blank, and suspension assembly in which the load beam blank and the flexure blank overlapping each other will be explained.

Figure 1:
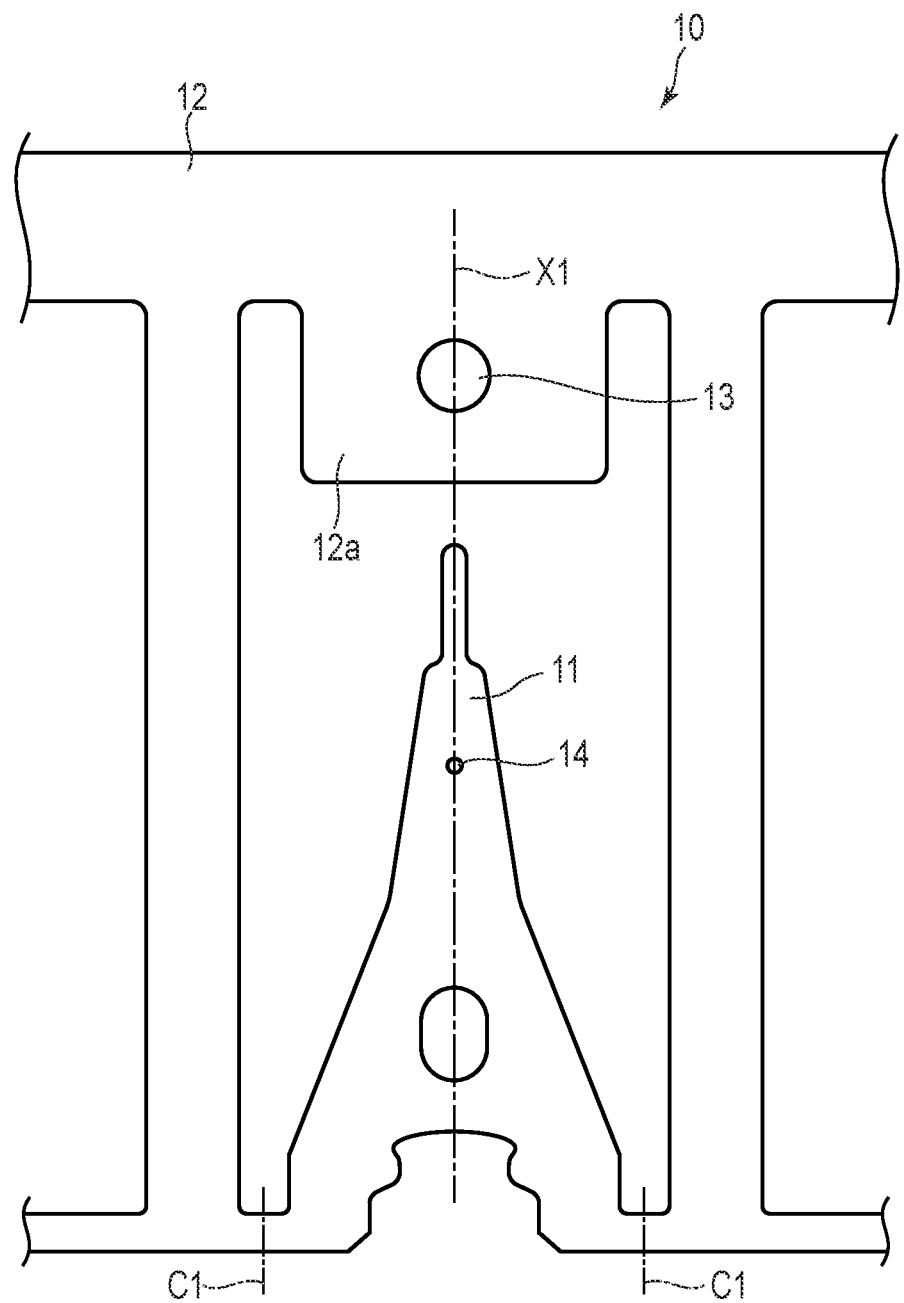
FIG. 1 is a schematic plan view of a load beam blank of a first embodiment.

FIG. 1 is a schematic plan view of a load beam blank 10 of the first embodiment. The load beam blank 10 includes a load beam 11 and a first frame 12. The load beam blank 10 is formed of a metal plate (thin plate spring) through a processing method such as etching and pressing. The metal plate is formed of a metal material such as stainless steel.

The load beam 11 extends in a direction along an axis line X1. On the axis line X1 of the load beam 11, a dimple 14 is formed. The first frame 12 is formed integrally with the load beam 11. The first frame 12 is separated from the load beam 11 in the manufacturing process of the suspension. Two-dotted lines C1 in FIG. 1 indicate to-be-cut parts.

The first frame 12 includes an extension 12a extending toward the load beam 11. A convex portion 13 is formed on the axis line X1 of the extension 12a. The convex portion 13 is formed in a dome-like shape protruding toward the surface side where a flexure blank 20 which will be described later overlaps. The dome-like shape is, for example, a hemispherical shape.

The convex portion 13 is formed, for example, through pressing using a mold. The convex portion 13 is formed in a process forming the dimple 14. Note that a process of forming the convex portion 13 and a process of forming the dimple 14 may be performed independently.

Figure 2:
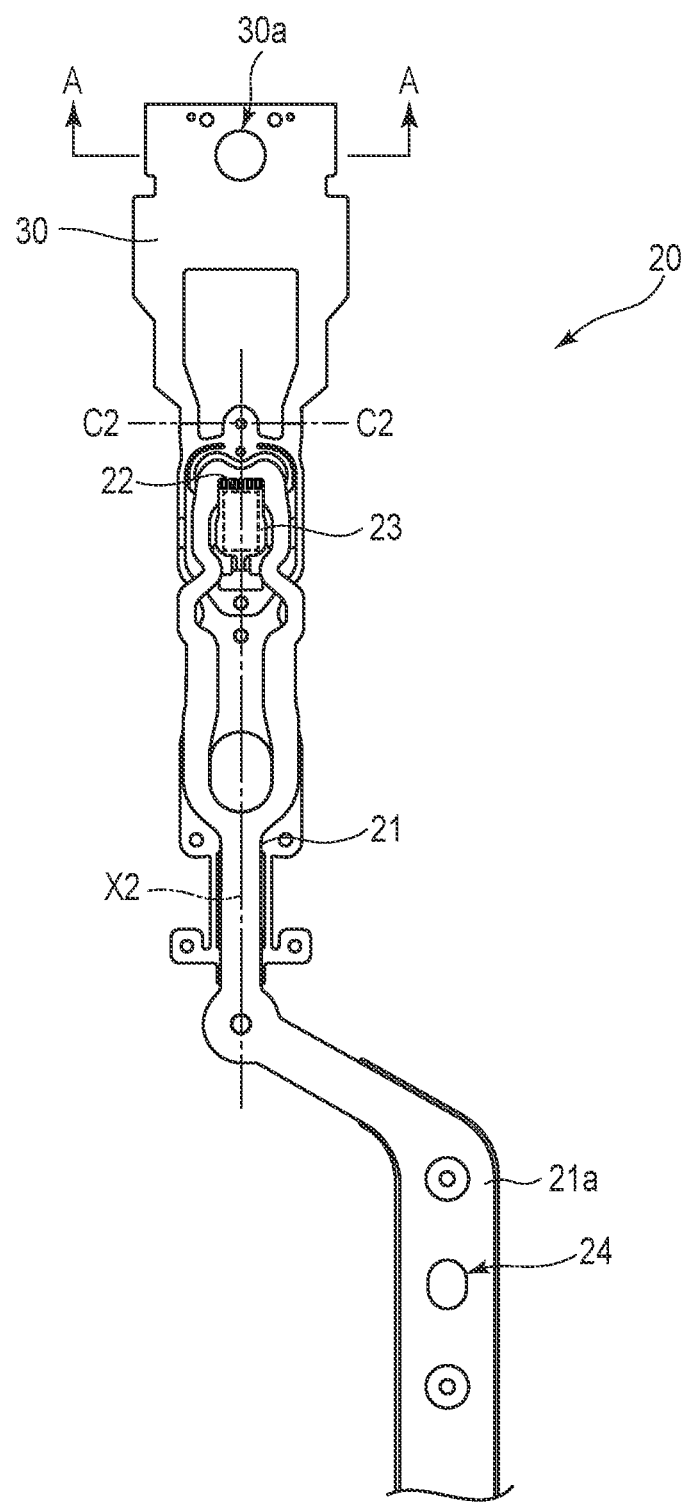
FIG. 2 is a schematic plan view of a flexure blank of the first embodiment.

FIG. 2 is a schematic plan view of the flexure blank 20 of the first embodiment. The flexure blank 20 includes a flexure 21 and a second frame 30. The flexure blank 20 is formed of a metal plate (thin plate spring) through a processing method such as etching and pressing. The metal plate is formed of, for example, a metal material such as stainless steel which is thinner than the load beam 11. The flexure 21 includes a metal plate and a line part formed along the metal plate. The line part includes a conductor layer such as copper and an insulating layer such as polyimide, for example.

The flexure 21 includes a pad 22 in the tip side (second frame 30 side), to which a slider 23 (the part depicted by a dotted line in FIG. 2) is connected. The slider 23 includes an element (transducer) to perform accesses such as read/write of data. The element is electrically conductive to a terminal of the slider 23, which is not shown. The terminal of the slider 23 is electrically connected to the pad 22 by bonding. If the bonding of the terminal and the pad 22 is not performed properly, a conductivity error such as short circuit may possibly occur.

The extension 21a of the flexure 21 extends in a direction along an axis line X2. A positioning part 24 is formed in the extension 21a. The positioning part 24 is, for example, a circular through hole; however, it is not limited thereto.

The second frame 30 is continuous to the flexure 21. The second frame 30 is separated from the flexure 21 in the manufacturing process of the suspension. Two-dotted lines C2 in FIG. 2 indicate to-be-cut parts.

An opening 30a is formed in the second frame 30. The opening 30a is formed in a position corresponding to the convex portion 13 formed in the first frame 12. Furthermore, the opening 30a is formed to receive the convex portion 13. The opening 30a is formed as a circle; however, it may be another shape which can receive the convex portion 13.

Figure 3:
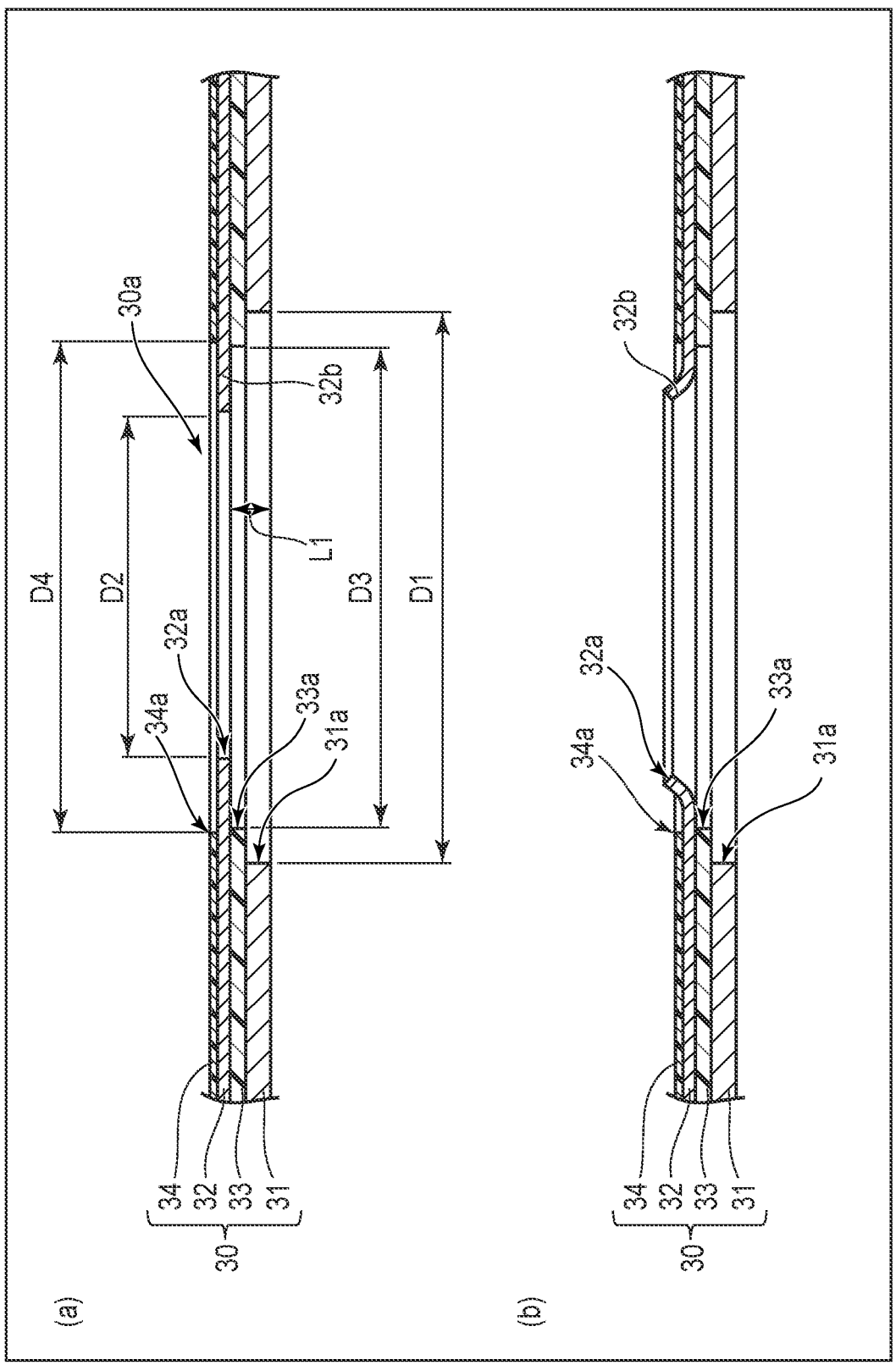
FIG. 3 is a schematic partial cross-sectional view of a second frame, taken along line A-A of FIG. 2.

FIG. 3 is a schematic partial cross-sectional view of the second frame 30, taken along line A-A of FIG. 2. Each of FIG. 3(a) and FIG. 3(b) shows an example of the structure mainly applicable to the cross-section of the opening 30a. In FIG. 3(a), the second frame 30 includes a metal base 31, conductor layer 32, insulating layer 33, and protection layer 34. The second frame 30 is formed by layering the insulating layer 33, conductor layer 32, and protection layer 34 on the metal base 31 in this order. For example, a length L1 from the lower surface of the metal base 31 to the lower surface of the conductor layer 32 is 0.025 mm.

The metal base 31 is formed of a metal material such as a stainless steel which is thinner than the load beam 11. The metal base 31 is continuous to the flexure 21. The conductor layer 32 is formed of a metal material which is softer than that of the load beam blank 10, and is, for example, copper. The conductor layer 32 is formed by etching to be a predetermined pattern on the insulating layer 33. As another method, the conductor layer 32 may be formed by a layer forming process such as plating on the insulating layer 33 which is, for example, formed by being masked in a predetermined pattern. The insulating layer 33 and the protection layer 34 are formed of an electric insulating material such as polyimide.

Furthermore, the second frame 30 and the flexure 21 have the same layering structure in the thickness direction. For example, the conductor layer 32 is formed of the same metal material used for the pad 22 formed on the flexure 21 and is formed in the same layer as with the pad 22. The layer including the conductor layer 32 and the pad 22 may be formed in the same process.

The metal base 31 includes a first opening 31a. The conductor layer 32 includes a second opening 32a. The insulating layer 33 includes a third opening 33a. The protection layer 34 includes a fourth opening 34a. The first opening 31a, second opening 32a, third opening 33a, and fourth opening 34a are, for example, circular. The first opening 31a, second opening 32a, third opening 33a, and fourth opening 34a overlap with each other to form the opening 30a.

The diameter D2 of the second opening 32a is smaller than the diameter D1 of the first opening 31a, diameter D3 of the third opening 33a, and diameter D4 of the fourth opening 34a. In other words, the conductor layer 32 protrudes further toward the inner side than the metal base 31, insulating layer 33, and protection layer 34. The conductor layer 32 includes an edge 32b protruding to the inner side more than the inner surface of the first opening 31a of the metal base 31. In the example depicted, the diameter D1 of the first opening 31a is greater than the diameter D3 of the third opening 33a and the diameter D4 of the fourth opening 34a. However, the diameter D1 of the first opening 31a may be smaller than the diameter D3 of the third opening 33a and the diameter D4 of the fourth opening 34a. Furthermore, as in FIG. 3(b), the edge 32b may be preliminarily bent from the insulating layer 33 to the protection layer 34 side.

Figure 4:
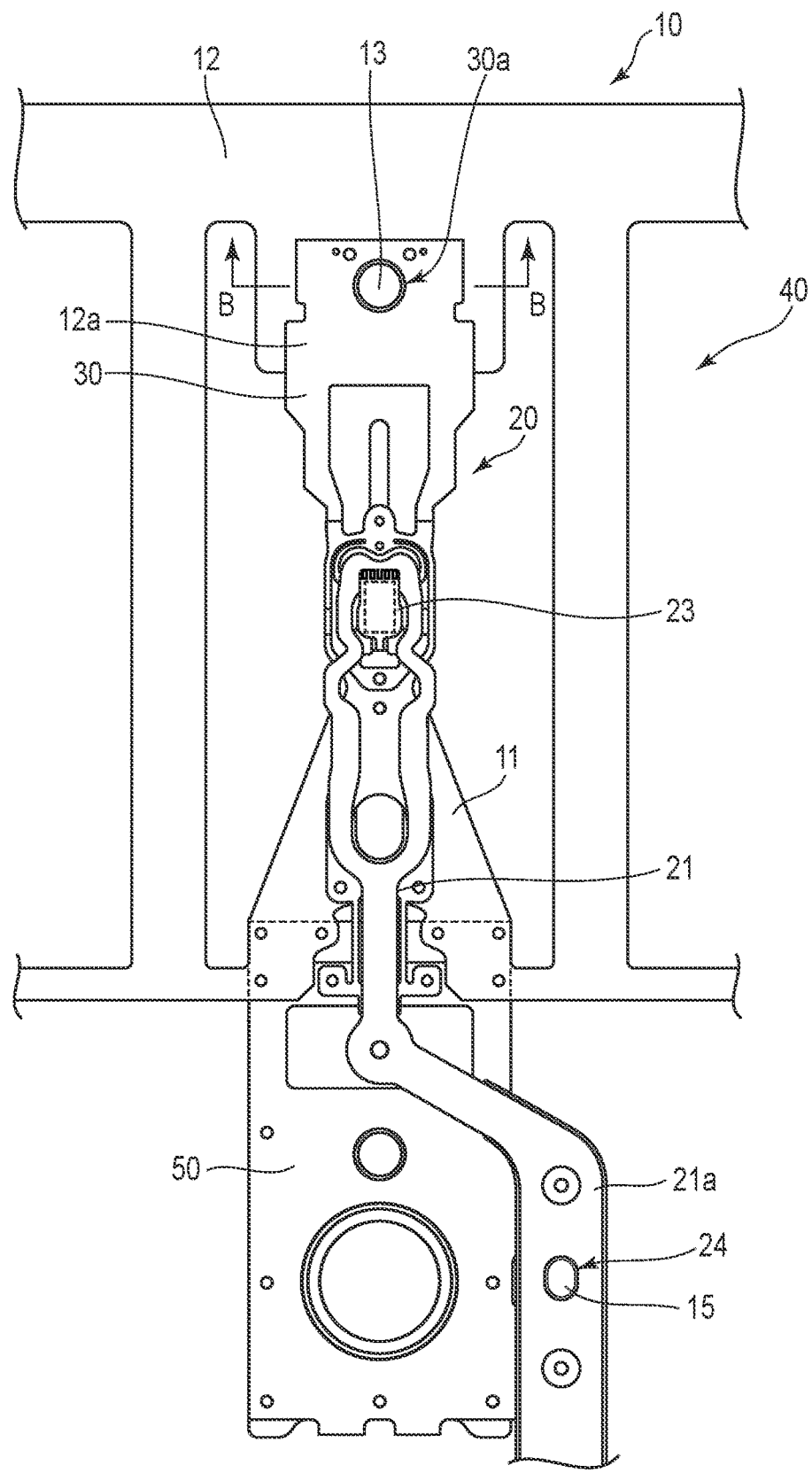
FIG. 4 is a schematic plan view of a suspension assembly of the first embodiment.

FIG. 4 is a schematic plan view of a suspension assembly 40 of the first embodiment. The suspension assembly 40 includes the load beam blank 10, flexure blank 20, and base plate 50. The suspension assembly 40 is formed by overlapping the flexure blank 20 along the load beam blank 10. The extension 21a of the flexure 21 is fixed to the base plate 50.

When the load beam blank 10 and the flexure blank 20 overlaid, the convex portion 13 is inserted into the opening 30a. When the convex portion 13 is inserted into the opening 30a, the edge 32b of the conductor layer 32 contacts the convex portion 13. A rotation stopper 15 is inserted in the positioning part 24. The rotation stopper 15 may be formed in the load beam blank 10, or may be formed in a different member which is not shown. The positioning part 24 is formed in any position corresponding to the rotation stopper 15, and thus, may be formed in a different position of the flexure blank 20 (for example, flexure tail which is not shown).

When the load beam blank 10 and the flexure blank 20 are overlaid, not only the convex portion 13 is inserted to the opening 30a but also the rotation stopper 15 is inserted to the positioning part 24. When the rotation stopper 15 is inserted to the positioning part 24, the rotation of the flexure blank 20 about the convex portion 13 can be stopped. That is, by inserting the rotation stopper 15 to the positioning part 24, the positioning of the rotation direction can be determined.

After the positioning of the rotation direction, the opening 30a is pressed to the convex portion 13 to be engaged therein, and the final positioning is performed. Then, the load beam 11 and the flexure 21 are fixed to each other by laser welding or the like. Then, the load beam 11 is separated from the first frame 12. Furthermore, the flexure 21 is separated from the second frame 30, the suspension is completed.

FIG. 5 is a schematic partial cross-sectional view of the suspension assembly 40, taken along line B-B of FIG. 4. FIG. 5 mainly shows a cross-section of the convex portion 13 and the opening 30a. FIG. 5 shows a state where the convex portion 13 is engaged in the opening 30a and the final positioning is performed.

Now, a process of inserting the convex portion 13 in the opening 30a will be explained. When the convex portion 13 is inserted in the opening 30a, the second opening 32a of the conductor layer 32 contacts a first surface 13a (outer surface) of the convex portion 13. When the convex portion 13 is further inserted in the opening 30a, since the conductor layer 32 is formed of a metal material softer than the load beam blank 10 as described above, the edge 32b transforms along the shape of the convex portion 13. Thus, the convex portion 13 fits in the opening 30a, and the final positioning is done.

In the present embodiment, the diameter D1 of the first opening 31a of the metal base 31 is greater than the outer diameter D5 of the convex portion 13. Thus, the inner surface and the edge of the first opening 31a do not contact the first surface 13a or the bottom H of the convex portion 13. Furthermore, since the diameter D3 of the third opening 33a and the diameter D4 of the fourth opening 34a are greater than the outer diameter D5 of the convex portion 13, the third opening 33a and the fourth opening 34a do not contact the convex portion 13.

On the other hand, the diameter D2 of the second opening 32a of the conductor layer 32 is smaller than the outer diameter D5 of the convex portion 13. Thus, the edge 32b contacts the first surface 13a. Furthermore, the insulating layer 33 is disposed between the conductor layer 32 and the metal base 31, and thus, the edge 32b does not contact the bottom H.

Since only the edge 32b contacts the first surface 13a, a process of transformation of the edge 32b is not prevented by the other parts contacting the convex portion 13. Since the convex portion 13 securely fits in the opening 30a while other parts do not contact the convex portion 13, the accuracy of positioning of the flexure blank 20 with respect to the load beam blank 10 is improved.

The edge 32b includes a second surface 32c in the metal base 31 side. A contact angle α formed by a plan parallel to the metal base 31 and the second surface 32c is, preferably, 45 degrees or more. If the contact angle α is 45 degrees or more, the centers of the convex portion 13 and the opening 30a easily match when the convex portion 13 is inserted in the opening 30a, and the accuracy of positioning of the flexure blank 20 with respect to the load beam blank 10 is further improved.

Furthermore, the thickness t1 of the part where the convex portion 13 is formed is formed to be thinner than the thickness t2 of the part other than the convex portion 13 part. The first frame 12 includes a thinner part 12b around the convex portion 13. For example, by performing a half-etching process to a predetermined part of the first frame 12, the thinner part can be formed. Since the thickness t1 of the part where the convex portion 13 is thinner than the thickness t2 of the part other than the convex portion 13 part, a spherical surface treatment of the convex portion 13 is facilitated as compared to a case where the thickness t1 is thicker. Furthermore, the thinner part 12b is formed around the convex portion 13 alone to prevent decrease of the strength of the first frame 12. If the thinner part 12b is positioned within the first opening 31a in a plan view, the strength of the first frame 12 in the part where the metal base 31 is disposed can be secured.

Furthermore, if the edge 32b is preliminarily bent from the insulating layer 33 side to the protection layer 34 side as in FIG. 3(b), when the convex portion 13 is inserted in the opening 30a, friction between the first surface 13a and the second surface 32c occurring in the initial state where the edge 32 is transformed can be reduced. Furthermore, adherence (contamination) of microparticles produced when the edge 32b is transformed can be decreased.

As described above, the convex portion 13 formed in the first frame 12 and the opening 30a formed in the second frame 30 are engaged, and thus, the accuracy of positioning of the flexure with respect to the load beam can be improved.

Especially, in the present embodiment, the edge 32b of the second opening 32a is transformed along the convex portion 13 such that the convex portion 13 is fit in the opening 30a. In a hypothetical case where the edge of the first opening 31a contacts the convex portion 13, since the first opening 31a is formed in the metal base 31 which is formed of the same metal material used for the load beam 11 (for example, stainless steel), the edge does not tend to transform along the convex portion 13. Thus, if the diameter of the first opening 31a is, for example, smaller as compared to the outer diameter of the convex portion 13, the convex portion 13 does not fit well in the opening 30a. Furthermore, an R part is formed in the corner of the bottom H of the convex portion 13. Even if the outer diameter of the convex portion 13 and the diameter of the first opening 31a substantially match, the R part may interfere the edge of the first opening 31a and prevent proper fitting of the convex portion 13 in the opening 30a. On the other hand, the conductor layer 32 including the second opening 32a is formed of a metal material softer than that of the load beam 11 (for example, copper), and thus, the edge 32b easily transforms along the convex portion 13. Thus, as in the present embodiment, if the edge of the first opening 31a does not contact the convex portion 13 while the edge 32b of the second opening 32a contacts the convex portion 13, the convex portion 13 can be securely fit in the opening 30a.

Furthermore, in a hypothetical case where the edge of the first opening 31a contacts the convex portion 13, the edge does not tend to transform along the convex portion 13 as described above, and thus, the relative heights between the load beam blank 10 and the flexure blank 20 vary because of the variety of the diameter of the first opening 31a. In contrast, if the edge of the second opening 32a which is easily transformable contacts the convex portion 13, even if the diameter of the second opening 32a is varied, the fitting of the convex portion 13 and the opening 30a is not easily influenced. Thus, the varying in the relative heights between the lead beam blank 10 and the flexure blank 20 can be suppressed. Thus, deformation in the assembly process can be prevented, and positioning performance can be improved.

In the present embodiment, the convex portion 13 is formed in the extension 12a of the first frame 12, which is close to the tip of the load beam 11. Thus, the accuracy of positioning of the flexure 21 in the tip of the load beam 11 can be improved. As a result, a gimbal in which the accuracy of positioning of the flexure 21 with respect to the dimple 14 is high can be structured. With the gimbal with high positioning accuracy, the accuracy of connection between the slider 23 and the pad 22 provided with the gimbal can be increased. Furthermore, an error caused by assembly of the slider 23 does not easily occur. Furthermore, if the convex portion 13 is formed as close as possible to the tip side of the load beam 11, further improvement of the accuracy in positioning can be expected.

Furthermore, in the present embodiment, the convex portion 13 is formed in the first frame 12 and the opening 30a is formed in the second frame 30. Thus, scratches to the load beam 11 and the flexure 21 during the positioning can be prevented, and the quality of the suspension is improved. Furthermore, since an opening or the like used for positioning is not provided with the suspension, a large space for positioning is not required in the suspension. Thus, freedom of design of the suspension is not affected.

The first frame 12 in which the convex portion 13 is formed and the second frame 30 in which the opening 30a is formed are separated from the load beam 11 and the flexure 21, respectively. Thus, fitting part of the convex portion 13 and the opening 30a which causes dust is not remained in the completed suspension. Thus, a possibility that burr and contamination occur in the completed suspension can be decreased.

Second Embodiment

Figure 6:
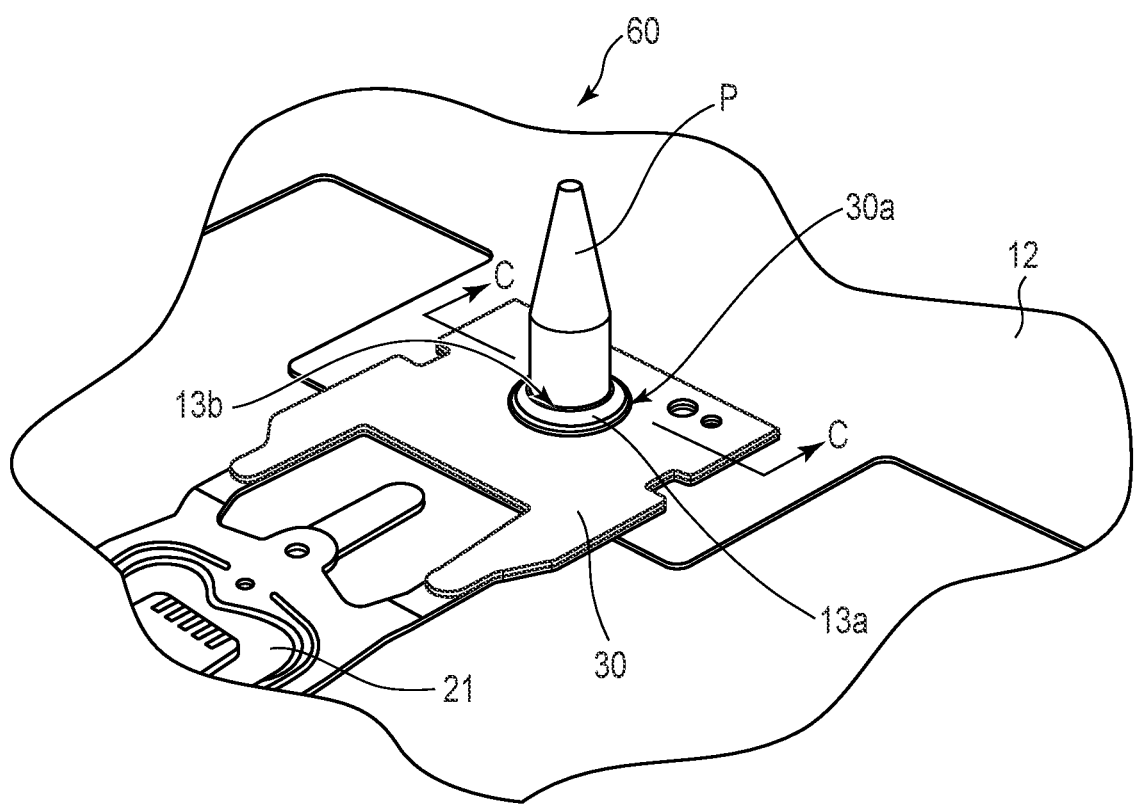
FIG. 6 is a schematic perspective view of a suspension assembly of a second embodiment.
Figure 7:
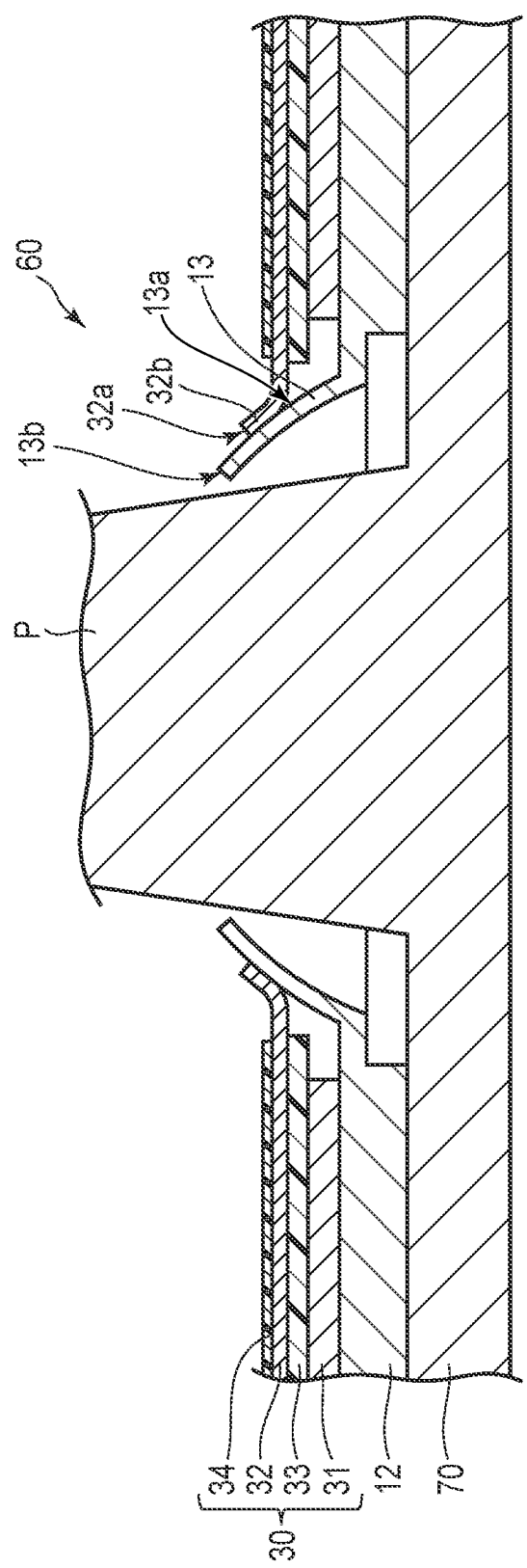
FIG. 7 is a schematic partial cross-sectional view of the suspension assembly, taken along line C-C of FIG. 6.

Now, the second embodiment will be explained. Elements similar to those of the first embodiment are referred to by the same reference numbers, and description will be omitted. FIG. 6 is a schematic perspective view of a suspension assembly 60 of the second embodiment. FIG. 7 is a schematic partial cross-sectional view of the suspension assembly 60, taken along line C-C of FIG. 6. In the present embodiment, a convex portion 13 includes an opening 13b. In this respect, the second embodiment differs from the first embodiment. The opening 13b may be formed at the center of the convex portion 13, or may be formed to be shifted from the center of the convex portion 13.

A load beam blank 10 is disposed on a base 70. The base 70 includes a pin P which is inserted in the opening 13b. In FIG. 7, there is a gap between the opening 13b and the pin P. A flexure blank 20 is overlaid along with the load beam blank 10 arranged to match the pin P to form the suspension assembly 60.

If the opening 13b is preliminarily formed in a position where the convex portion 13 is formed, the metal material is not excessively extended when the convex portion 13 is formed. Thus, as compared to a case where the convex portion 13 does not include the opening 13b, the convex portion 13 can be formed while the first surface 13a is maintained in a smooth state. Furthermore, if the convex portion 13 includes the opening 13b, the load beam blank 10 can be arranged using the pin P as reference, and the arrangement of the load beam blank 10 can easily be performed. The position of the flexure blank 20 can be finely tuned by slightly shifting the position of the convex portion 13 with respect to the opening 13b.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method of a disc device suspension which includes a load beam and a flexure fixed to the load beam, the method comprising:
   forming a load beam blank including the load beam and a first frame continuous to the load beam;
   forming a flexure blank including the flexure and a second frame continuous to the flexure;
   forming a convex portion in the first frame;
   forming an opening in the second frame in a position corresponding to the convex portion to receive the convex portion;
   overlapping the load beam blank with the flexure blank to insert the convex portion into the opening;
   fixing the flexure to the load beam; and
   separating the load beam from the first frame and the flexure from the second frame after the fixing,
   wherein:
   the second frame includes a metal base and a conductor layer formed of a metal material which is softer than the load beam,
   the opening includes a first opening formed in the metal base and a second opening formed in the conductor layer to overlap the first opening,
   the conductor layer includes an edge protruding to an inner side more than an inner surface of the first opening, and
   the edge contacts the convex portion when the convex portion is inserted into the opening.

2. The manufacturing method of claim 1, wherein the convex portion is formed in a dome-like shape.

3. The manufacturing method of claim 2, wherein:
   the first opening and the second opening are circular, and
   a diameter of the first opening is greater than an outer diameter of the convex portion, and a diameter of the second opening is smaller than the outer diameter of the convex portion.

4. The manufacturing method of claim 3, wherein an edge of the second opening contacts the convex portion.

5. The manufacturing method of claim 4, wherein when the convex portion is inserted into the opening, the edge of the second opening transforms along the convex portion.

6. The manufacturing method of claim 4, further comprising:
   bending the edge of the second opening before the convex portion is inserted into the opening.

7. The manufacturing method of claim 2, further comprising:
   forming an opening in the convex portion.

8. The manufacturing method of claim 2, further comprising:
   forming a pad connected to a terminal of a slider used for read/write of data, the pad being formed of a same metal material as a metal material used for the conductor layer and being formed in a same layer as the conductor layer.

9. A suspension assembly including a load beam blank and a flexure blank for a disc device suspension, wherein:
   the load beam blank includes a load beam, a first frame continuous to the load beam, and a convex portion formed in the first frame,
   the flexure blank includes a flexure overlapping the load beam, a second frame continuous to the flexure, and an opening formed in a position corresponding to the convex portion of the second frame,
   the second frame includes a metal base and a conductor layer formed of a metal material softer than the load beam,
   the opening includes a first opening formed in the metal base and a second opening formed in the conductor layer to overlap the first opening, and
   the conductor layer includes an edge protruding to an inner side more than an inner surface of the first opening.

10. The suspension assembly of claim 9, wherein the convex portion is formed in a dome-like shape.

11. The suspension assembly of claim 10, wherein:
    the first opening and the second opening are circular, and
    a diameter of the first opening is greater than an outer diameter of the convex portion, and a diameter of the second opening is smaller than the outer diameter of the convex portion.

12. The suspension assembly of claim 10, wherein a thickness of a part of the first frame where the convex portion is formed is thinner than a thickness of parts of the first frame other than the part where the convex portion is formed.

13. The suspension assembly of claim 10, wherein the convex portion includes an opening.

14. The suspension assembly of claim 10, wherein:
    the flexure includes a pad connected to a terminal of a slider used for read/write of data, and
    the pad is formed of a same metal material as a metal material used for the conductor layer and is formed in a same layer as the conductor layer.

* * * * *